(12) United States Patent
Da Silva

(10) Patent No.: US 7,156,444 B1
(45) Date of Patent: Jan. 2, 2007

(54) WINDSHIELD COVERING SYSTEM

(76) Inventor: Sebastian A. Da Silva, 12 Hawtrey Drive, Ruislip, London, HA4 8QW (GB)

( * ) Notice: Subject to any disclaimer, the term of this patent is extended or adjusted under 35 U.S.C. 154(b) by 0 days.

(21) Appl. No.: 11/244,657

(22) Filed: Oct. 6, 2005

(51) Int. Cl.
 *B60J 11/08* (2006.01)
(52) U.S. Cl. ............... 296/95.1; 296/210; 296/142; 296/224
(58) Field of Classification Search ............ 296/95.1, 296/97.1, 97.4, 97.7, 97.11, 142, 136.01, 296/210, 190.08, 224, 136.1; 280/847; 70/168, 70/172
See application file for complete search history.

(56) References Cited

U.S. PATENT DOCUMENTS

| | | | | |
|---|---|---|---|---|
| 2,470,477 A | * | 5/1949 | Ellithorpe | ............... 296/95.1 |
| 2,854,282 A | * | 9/1958 | Nichols | ............... 296/95.1 |
| 3,770,313 A | | 11/1973 | Jimenez | |
| 4,280,414 A | * | 7/1981 | Allshouse et al. | ......... 109/49.5 |
| 4,929,016 A | | 5/1990 | Kastanis | |
| 5,230,499 A | | 7/1993 | Schneider | |
| 5,232,244 A | * | 8/1993 | Itoh | ............... 280/749 |
| D352,691 S | | 11/1994 | Farr | |
| 6,206,451 B1 | | 3/2001 | Maano | |
| 6,217,101 B1 | * | 4/2001 | Stephan | ............... 296/95.1 |
| 6,227,601 B1 | * | 5/2001 | LaFrance | ............... 296/97.4 |
| 6,279,984 B1 | * | 8/2001 | Reina, Jr. | ............... 296/97.1 |
| 6,425,623 B1 | * | 7/2002 | Nakayama | ............... 296/95.1 |
| 6,536,829 B1 | * | 3/2003 | Schlecht et al. | ........... 296/97.4 |
| 6,609,747 B1 | * | 8/2003 | Ruiz | ............... 296/95.1 |
| 6,641,203 B1 | | 11/2003 | Everett | |
| 6,695,381 B1 | * | 2/2004 | Schlecht et al. | ........... 296/97.4 |
| 6,991,283 B1 | * | 1/2006 | Akahane et al. | ....... 296/190.08 |
| 2004/0245755 A1 | * | 12/2004 | Akahane et al. | ............ 280/756 |

\* cited by examiner

*Primary Examiner*—Dennis H. Pedder
*Assistant Examiner*—Greg Blankenship

(57) ABSTRACT

A windshield covering system includes a pair of tracks. Each of the tracks is attached to a roof of a vehicle. The tracks are each positioned adjacent to one of a pair of lateral sides of the roof and each extends along one of a pair of lateral edge of a windshield of the vehicle. A panel has a pair of side edges. Each of the side edges is positioned in one of the tracks. The panel is selectively positioned in a stored position over the roof or in an extended position extending downwardly over the windshield. The panel is opaque and comprises a resiliently flexible material.

5 Claims, 5 Drawing Sheets

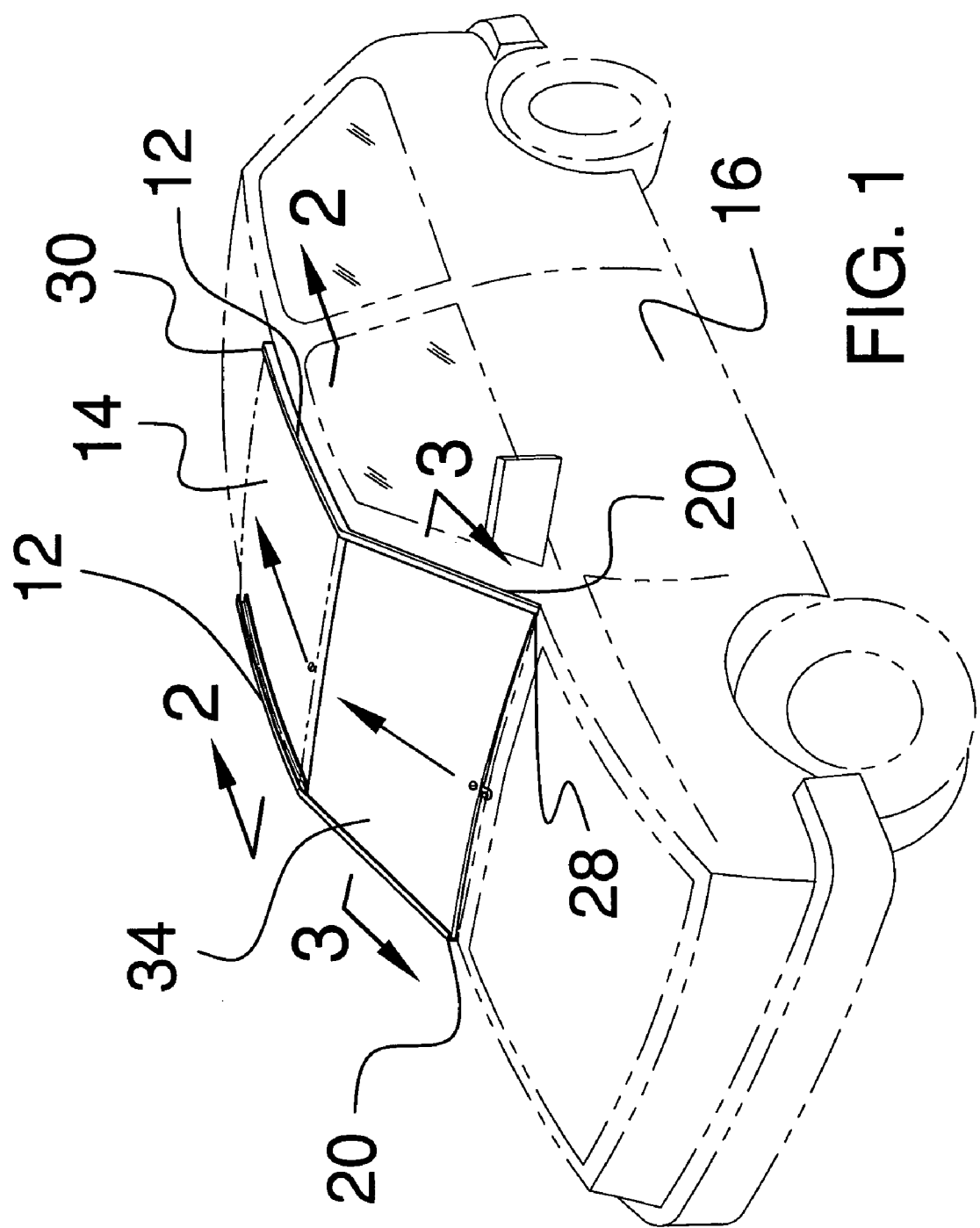

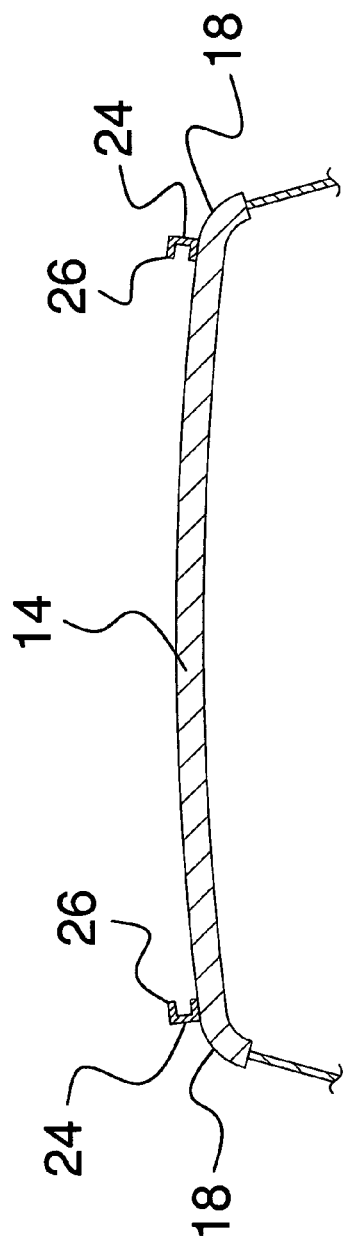
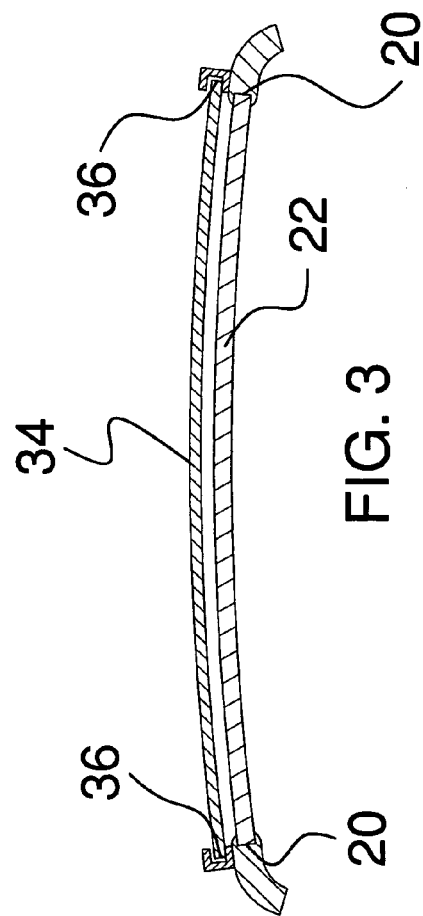

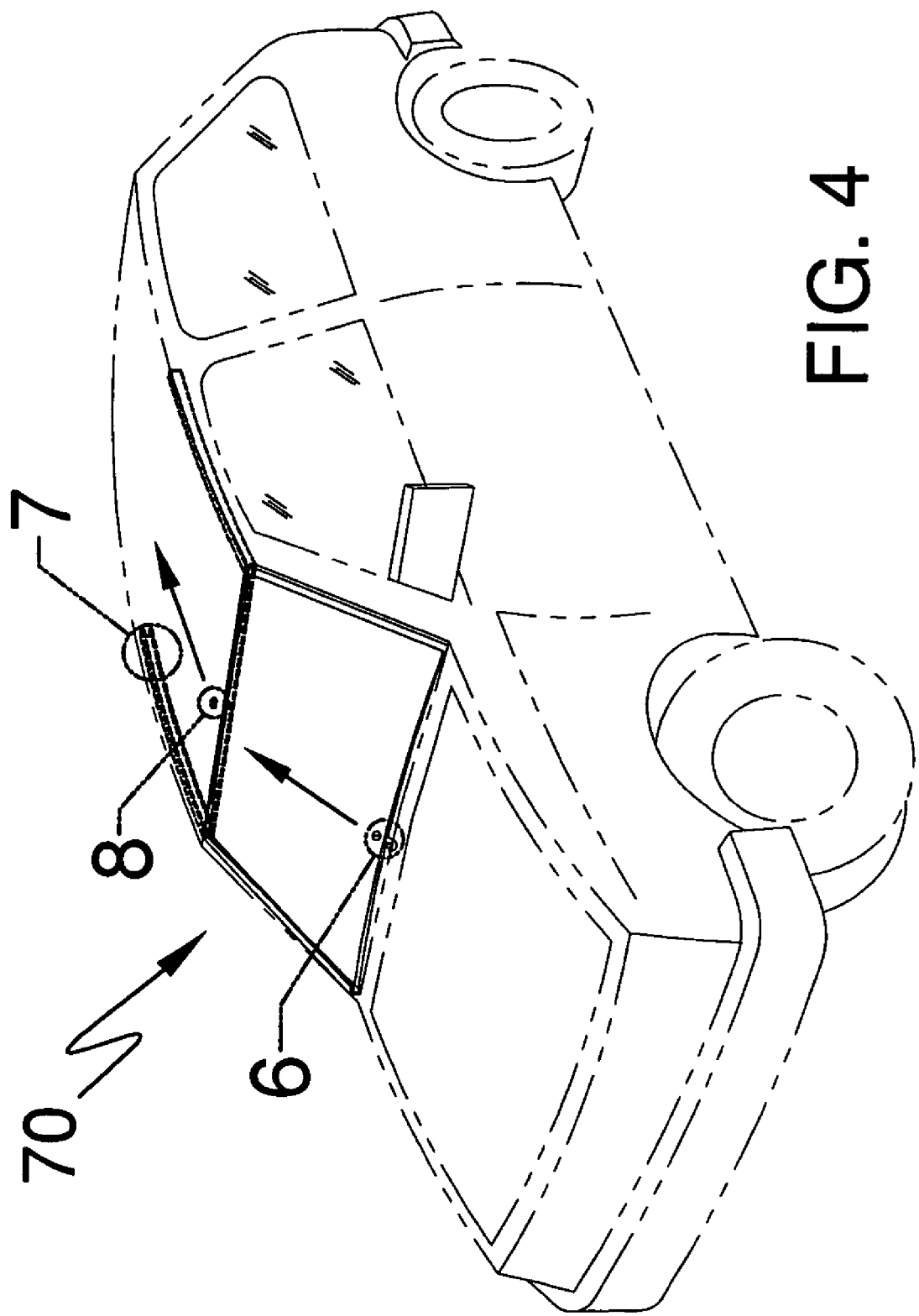

WINDSHIELD COVERING SYSTEM

BACKGROUND OF THE INVENTION

1. Field of the Invention

The present invention relates to windshield coverings and more particularly pertains to a new windshield covering for preventing ice and snow build up on a windshield and to block light from entering a vehicle through the windshield.

2. Description of the Prior Art

The use of windshield coverings is known in the prior art. U.S. Pat. No. 6,206,451 describes a device that includes a housing mounted on top of a vehicle and which includes a pair of rigid panels that are extendable outwardly of the housing so that they extend over and are spaced from the vehicle's front and rear windows. Another type of windshield covering is U.S. Pat. No. 3,770,313 having a covering positioned within an engine hood of the vehicle which can be extended outwardly to cover a windshield of the vehicle. Still yet another windshield covering device is found in U.S. Pat. No. 4,929,016 and includes a flexible panel that is extendable from a roof of a vehicle toward a front end of the vehicle where it may be attached with a plurality of coupling members.

While these devices fulfill their respective, particular objectives and requirements, the need remains for a device that may be extended from the roof as needed to cover a windshield and thereby protect the vehicle form sunlight and protect the windshield from snow and ice build-up. The device may be positioned within the roof so that it is not obvious when no in use.

SUMMARY OF THE INVENTION

The present invention meets the needs presented above by generally comprising a pair of tracks. Each of the tracks is attached to a roof of a vehicle. The tracks are each positioned adjacent to one of a pair of lateral sides of the roof and each extends along one of a pair of lateral edge of a windshield of the vehicle. A panel has a pair of side edges. Each of the side edges is positioned in one of the tracks. The panel is selectively positioned in a stored position over the roof or in an extended position extending downwardly over the windshield. The panel is opaque and comprises a resiliently flexible material.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a windshield covering system according to the present invention.

FIG. 2 is a cross-sectional view taken along line 2—2 of FIG. 1 of the present invention.

FIG. 3 is a cross-sectional view taken along line 3—3 of FIG. 1 of the present invention.

FIG. 4 is a perspective view of a second embodiment of the present invention.

DESCRIPTION OF THE PREFERRED EMBODIMENT

Figure 5:
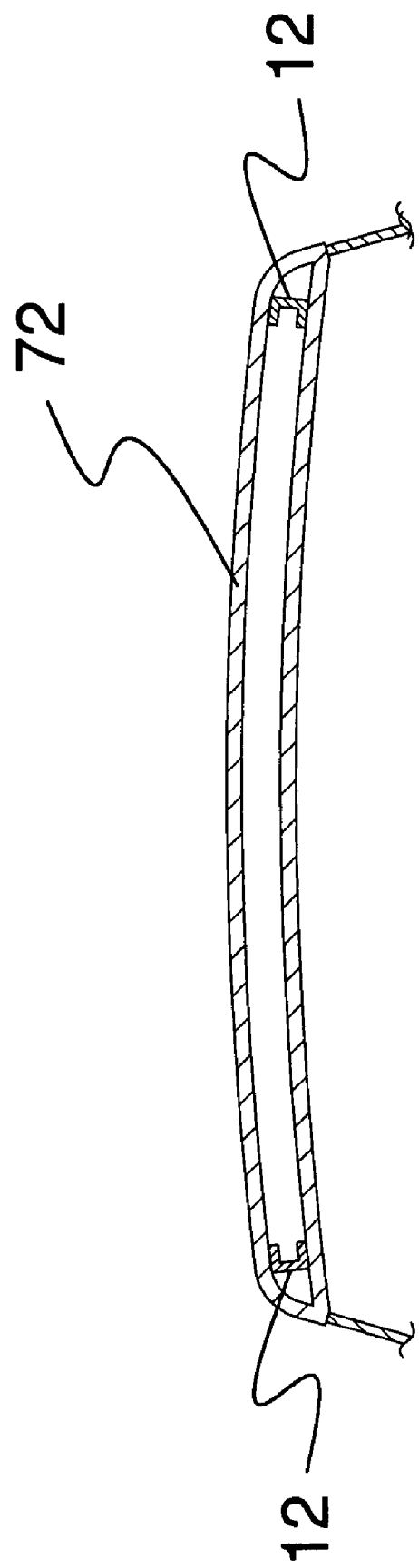
FIG. 5 is a cross-sectional view of the second embodiment of the present invention.
Figure 6:
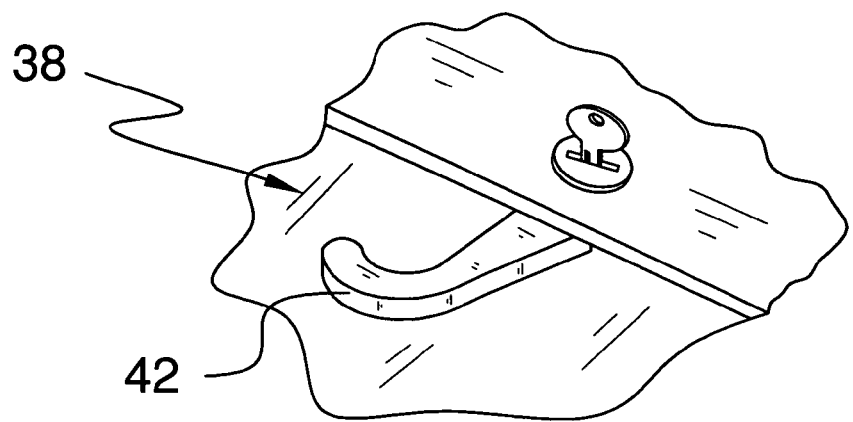
FIG. 6 is an enlarged view of area 6 of FIG. 4 of the present invention.
Figure 7:
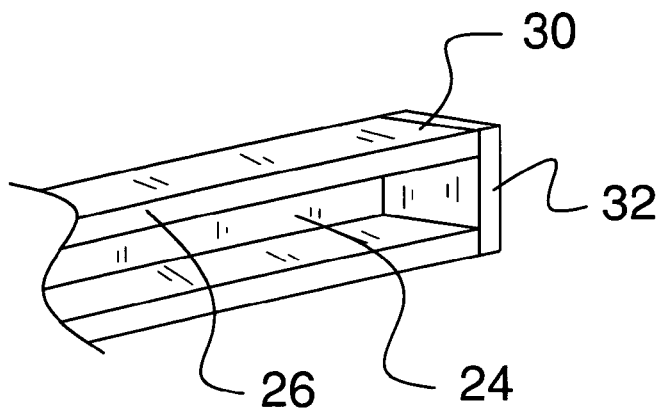
FIG. 7 is an enlarged view of area 7 of FIG. 4 of the present invention.
Figure 8:
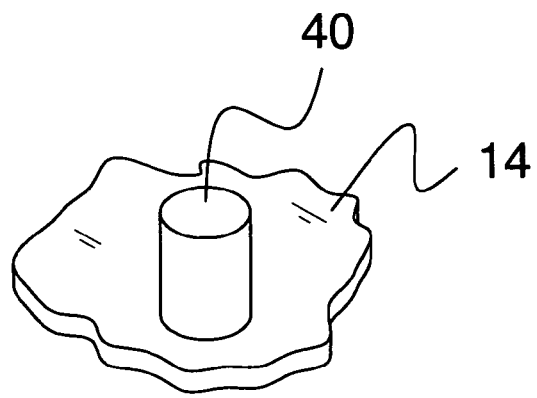
FIG. 8 is an enlarged view of area 8 of Figure of the present invention.

With reference now to the drawings, and in particular to FIGS. 1 through 8 thereof, a new windshield covering embodying the principles and concepts of the present invention and generally designated by the reference numeral 10 will be described.

As best illustrated in FIGS. 1 through 8, the windshield covering system 10 generally comprises a pair of tracks 12. Each of the tracks 12 is attached to a roof 14 of a vehicle 16. Each of the tracks 12 is positioned adjacent to one of a pair of lateral sides 18 of the roof 14 and each extends down and is coextensive with one of a pair of lateral edges 20 of a windshield 22 of the vehicle 16. The tracks 14 each include a side wall 24 orientated perpendicular to the roof 14 and a lip 26 that is attached to and extends along an upper edge of the side walls 24. The lips 26 extend toward each other. Each of the tracks 12 has a proximal end 28 and a distal end 30 with respect to a forward end of the vehicle 16. The tracks 12 each include an end wall 32 that is attached to a respective one of the distal ends 30. FIGS. 4 and 5 show a second version 70 wherein a covering 72 is extending over a section of the tracks 12 that are positioned on the roof 14. The covering 72 forms an upper portion of the roof 14 so that those sections of the tracks 12 are positioned within the roof 14 of the vehicle 16.

A panel 34 has a pair of side edges 36. Each of the side edges 36 is positioned in one of the tracks 12 so that the panel 36 extends between the tracks 12. The panel 36 is selectively positioned in a stored position over the roof 14 or in an extended position extending downwardly over the windshield 22. The panel 34 is opaque and comprising a resiliently flexible material, such as a plastic material.

A locking assembly 38 is mounted on the panel 34 and is configured for selectively locking the panel 34 in the stored position. The locking assembly 38 includes a post 40 being attached to and extending upwardly from the roof 14 adjacent to the windshield 22. A catch 42 is rotatably coupled to the panel 34 and is positioned for engaging the post 40 when the panel 34 is in the stored position.

In use, the panel 34 is extended, when desired, from the roof 14 and positioned over the windshield 22. The panel 34 prevents light from entering the vehicle 16 and thereby aids in keeping the vehicle 16 cool. Further, the panel 34 may be extended over the windshield 22 to prevent the accumulation of ice and snow on the windshield 22 while the vehicle 16 is parked.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A windshield covering system for a motor vehicle, said system comprising:
    a pair of tracks, each of said tracks being attached to a roof of the vehicle, each of said tracks being positioned adjacent to one of a pair of lateral sides of the roof and extending along one of a pair of lateral edges of a windshield of the vehicle; and
    a panel having a pair of side edges, each of said side edges being positioned in one of said tracks, said panel being selectively positioned in a stored position over said roof or in an extended position extending downwardly over the windshield, said panel being opaque and comprising a resiliently flexible material; and
    a locking assembly being mounted on said panel and being configured for selectively locking said panel in said stored position.

2. The system according to claim 1, wherein each of said tracks includes a side wall orientated perpendicular to said roof and a lip being attached to and extending along an upper edge of said side walls, said lips extending toward each other.

3. The system according to claim 2, wherein each of said tracks has a proximal end and a distal end with respect to a front end of the vehicle, each of said tracks including an end wall being attached to a respective one of said distal ends.

4. A windshield covering system for a motor vehicle, said system comprising:
    a pair of tracks, each of said tracks being attached to a roof of the vehicle, each of said tracks being positioned adjacent to one of a pair of lateral sides of the roof and extending along one of a pair of lateral edges of a windshield of the vehicle, each of said tracks including a side wall orientated perpendicular to said roof and a lip being attached to and extending along an upper edge of said side walls, said lips extending toward each other, each of said tracks having a proximal end and a distal end with respect to a front end of the vehicle, each of said tracks including an end wall being attached to a respective one of said distal ends;
    a panel having a pair of side edges, each of said side edges being positioned in one of said tracks, said panel being selectively positioned in a stored position over said roof or in an extended position extending downwardly over the windshield, said panel being opaque and comprising a resiliently flexible material; and
    a locking assembly being mounted on said panel and being configured for selectively locking said panel in said stored position.

5. A windshield covering system for a motor vehicle, said system comprising:
    a pair of tracks, each of said tracks being positioned in and attached to a roof of the vehicle, each of said tracks being positioned adjacent to one of a pair of lateral sides of the roof and extending along one of a pair of lateral edges of a windshield of the vehicle, each of said tracks including a side wall orientated perpendicular to said roof and a lip being attached to and extending along an upper edge of said side walls, said lips extending toward each other, each of said tracks having a proximal end and a distal end with respect to the windshield of the vehicle, each of said tracks including an end wall being attached to a respective one of said distal ends;
    a panel having a pair of side edges, each of said side edges being positioned in one of said tracks, said panel being selectively positioned in a stored position in said roof or in an extended position extending downwardly over the windshield, said panel being opaque and comprising a resiliently flexible material; and
    a locking assembly being mounted on said panel and being configured for selectively locking said panel in said stored position.

* * * * *